(12) United States Patent
Chaturvedi et al.

(10) Patent No.: US 8,806,028 B2
(45) Date of Patent: Aug. 12, 2014

(54) SYSTEM AND METHOD FOR ACCESSING DATA AND APPLICATIONS ON A HOST WHEN THE HOST IS IN A DORMANT STATE

(75) Inventors: Rahul Chaturvedi, San Diego, CA (US); John Jun Wu, San Diego, CA (US)

(73) Assignee: Novatel Wireless, Inc., San Diego, CA (US)

( * ) Notice: Subject to any disclaimer, the term of this patent is extended or adjusted under 35 U.S.C. 154(b) by 2105 days.

(21) Appl. No.: 11/740,828

(22) Filed: Apr. 26, 2007

(65) Prior Publication Data

US 2008/0270625 A1    Oct. 30, 2008

(51) Int. Cl.
*G06F 15/16* (2006.01)

(52) U.S. Cl.
USPC ............ 709/228; 709/208; 709/213; 709/220

(58) Field of Classification Search
CPC ............ H04W 36/0011; H04W 8/087; H04W 40/248; H04W 36/00; H04W 36/0083; H04B 7/18541; H04L 12/12; G06F 9/4418
USPC .................................. 709/208, 213, 220, 228
See application file for complete search history.

(56) References Cited

U.S. PATENT DOCUMENTS

| | | | | |
|---|---|---|---|---|
| 6,697,421 | B1 * | 2/2004 | Monroe et al. | 709/223 |
| 7,313,623 | B2 * | 12/2007 | Elzur et al. | 709/227 |
| 7,483,375 | B2 * | 1/2009 | Johnson et al. | 709/224 |
| 2002/0086719 | A1 | 7/2002 | Kedia | |
| 2003/0115415 | A1 | 6/2003 | Want et al. | |
| 2003/0158906 | A1 * | 8/2003 | Hayes | 709/211 |
| 2004/0030772 | A1 | 2/2004 | Newell et al. | |
| 2005/0144300 | A1 * | 6/2005 | Craft et al. | 709/230 |
| 2005/0198368 | A1 * | 9/2005 | Fleming et al. | 709/238 |
| 2006/0161871 | A1 | 7/2006 | Hotelling et al. | |
| 2006/0168281 | A1 * | 7/2006 | Starr et al. | 709/230 |
| 2007/0050426 | A1 | 3/2007 | Dubal et al. | |
| 2007/0233886 | A1 * | 10/2007 | Fan | 709/230 |

FOREIGN PATENT DOCUMENTS

WO    2004/088494 A1    10/2004

OTHER PUBLICATIONS

PCT Search Report dated Aug. 18, 2008 for PCT application No. PCT/US2008/061648.
European Search Report in European Patent Application No. 08746958.1, dated May 8, 2012.
Communication pursuant to Rules 70(2) and 70a(2) EPC in European Patent Application No. 08746958.1, dated May 25, 2012.

* cited by examiner

*Primary Examiner* — Phuoc Nguyen
(74) *Attorney, Agent, or Firm* — AlbertDhand LLP

(57) ABSTRACT

A system for enabling the viewing, distributing and/or manipulation of stored data or applications on a host device when the host device is in a power-save, dormant or other semi-active state. In one embodiment, a peripheral device is provided which runs its own native operating system. When the peripheral device is connected to the host device, which is running a different native operating system, the peripheral device is capable of sharing files that are stored on the host device, thereby permitting the viewing, editing, transferring or other manipulation of the files. In another embodiment, a wireless modem or similar device is integrated into the host device. When the host device enters a power-save or dormant state, a hand-off occurs to the wireless modem such that the files contained on the host device remain accessible.

33 Claims, 3 Drawing Sheets

SYSTEM AND METHOD FOR ACCESSING DATA AND APPLICATIONS ON A HOST WHEN THE HOST IS IN A DORMANT STATE

FIELD OF THE INVENTION

The present invention relates generally to electronic devices that are capable of entering a power-save or dormant state in order to conserve battery life. More particularly, the present invention relates to the accessing and/or manipulation of items contained on electronic devices when such devices are in such a dormant state.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A wide variety of electronic devices are capable of entering one or more states where many nonessential functions are shut down in order to preserve the life of a device's battery. These states are referred to with a variety of titles, including a standby state, a dormant state, a hibernation state, a power-save state, and others. Because all batteries have a limited life before they must be recharged, it is especially important for devices to be capable of utilizing the battery life as efficiently as possible. This is particularly important on smaller mobile devices, which are forced to possess smaller-capacity batteries while still be expected to operate for prolonged periods of time. To accomplish this goal of prolonging battery life, devices will enter such "semi-active" states, for example, where there has been an extended period of inactivity (the term "semi-active" should not be construed as being limited to a single dormant mode, sleep mode, or other type of state where functions are reduced so as to save power). For example, devices can be set or pre-programmed to enter a dormant state if a user and/or any other devices do not call on the device to perform any actions for thirty minutes, an hour or some other time.

When a device is in such a dormant state, virtually all normal functions for the device are shut down, and the device must re-awaken before these actions can once again be undertaken. The re-awakening can occur via various methods, such as by having a user actuate a key on the device, or the device can automatically re-awaken after a set period of time.

Although the entering of such semi-active states indeed serves to more efficiently utilize a device's battery life, this benefit comes at a cost to the user and others who may wish to access the device. As mentioned above, when a host device is in such a dormant state, most normal activities are not possible. As a result, when another device wants to access information on the host device, such as files, email, applications, or just general data, it is unable to do so until the host device has been reawaken. This is quite undesirable from the perspective of the requesting device, as this inaccessibility can prevent it from performing a plethora of desired actions. It would therefore be desirable to provide a system that enables other devices to access information in the host device even though the host device is in such a dormant state.

SUMMARY OF THE INVENTION

Various embodiments of the present invention provide improved systems for enabling the viewing, distributing and/or manipulation of stored data or applications on a host device when the host device is in a power-save, dormant or other such semi-active state. According to one embodiment, a peripheral device is provided which runs its own native operating system. When the peripheral device is connected to the host device, which is running a different native operating system, the peripheral device is capable of sharing files that are stored on the host device, thereby permitting the viewing, editing, transferring or other manipulation of the files. In another embodiment, a wireless modem or similar device is integrated into the host device. When the host device enters a power-save or dormant state, a hand-off occurs to the wireless modem such that the files contained on the host device remain accessible. With such systems, important documents such as email messages, files, and other items remain accessible while at the same time preserving the battery of the host device.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Various embodiments of the present invention provide improved systems for enabling the viewing, distributing and/or manipulation of stored data or applications on a host device when the host device is in a power-save, dormant or other type of semi-active state. According to one embodiment, a peripheral device is provided which runs its own native operating system. When the peripheral device is connected to the host device, which is running a different native operating system, the peripheral device is capable of sharing files that are stored on the host device, thereby permitting the viewing, editing, transferring or other manipulation of the files. In another embodiment, a device such as a wireless modem is integrated into the host device. When the host device enters a power-save or dormant state, a hand-off occurs to the wireless modem such that the files contained on the host device remain accessible.

Figure 1:
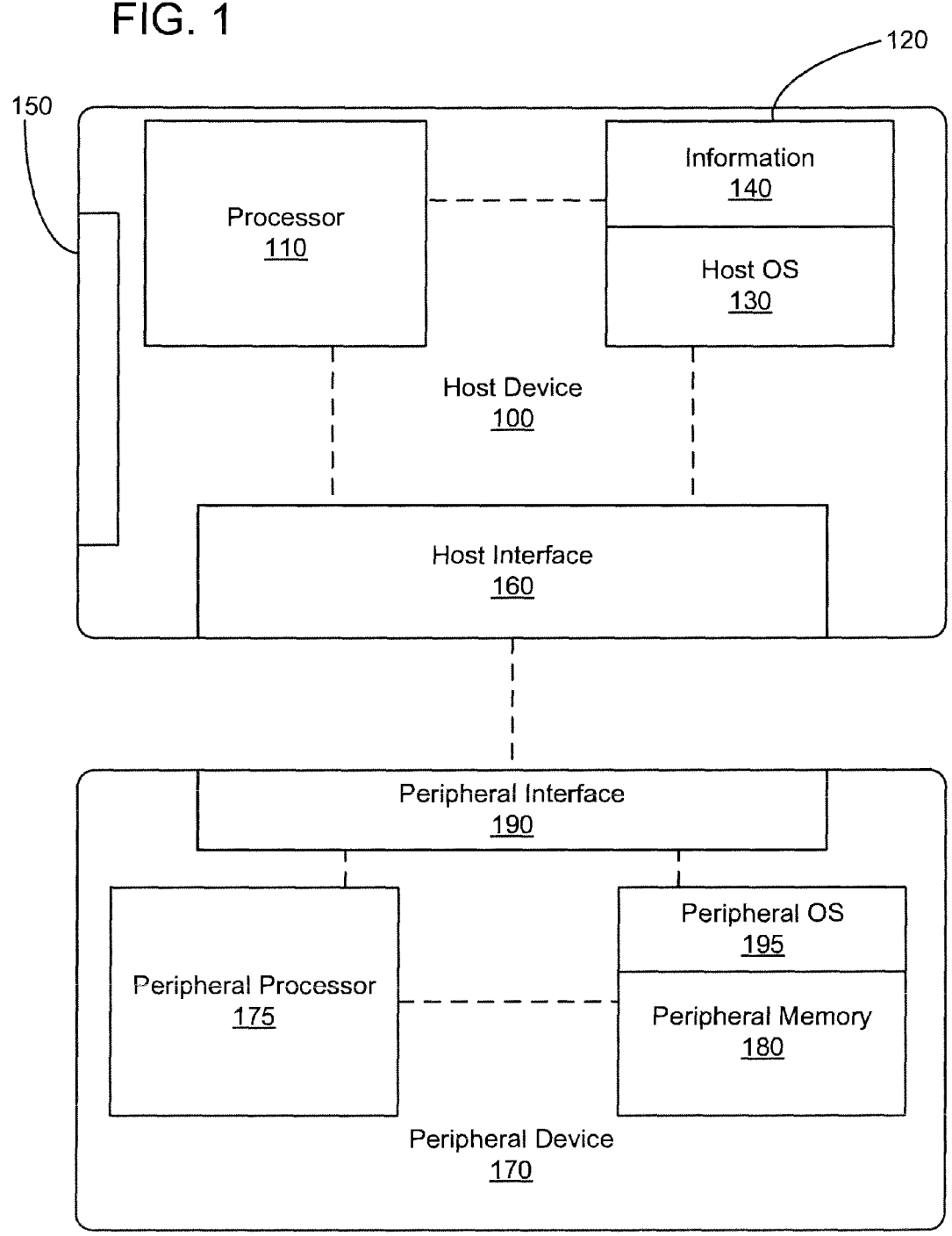
FIG. 1 is a representation a system implementing one embodiment of the present invention, where a peripheral device capable of receiving a handoff of control functions from a host device when the host device enters a semi-active state.

FIG. 1 is a representation a system implementing one embodiment of the present invention. As shown in FIG. 1, a host device 100 includes a processor 110 and a memory 120. For simplicity purposes, the memory 120 in FIG. 1 generically represents both volatile and non-volatile memory. The memory 120 includes a host native operating system 130 and a plurality of other information 140. This information 140 may include virtually any type of file that would typically exist in volatile or non-volatile memory, including but not limited to programs and applications, audio, video, images, email, text files, and general data. The host device 100 can include a wireless or wired connection 150 for accesses to a local or wide area network. The host device 100 can include a plurality of other components, including but not limited to a housing, a display (such as in the form of a liquid crystal display) a keypad or keyboard, a microphone, a speaker system, an antenna, a mouse, etc.

In addition to the above, the host device 100 also include a host device interface 160 for interacting with a peripheral device 170. Like the host device, the peripheral device 170 includes its own processor 175 and memory 180, with the peripheral memory 180 including a peripheral device operating system 185. The peripheral device 170 also includes at least one peripheral device interface 190 for interacting with the host device 100 through the host device interface 160. Both the host device interface 160 and the peripheral device interface 190 may be either wired or wireless in different embodiments of the invention.

The peripheral device 170 and the host device 100 are each configured to establish and maintain a connection with each other through their respective interfaces 190 and 160. when connected to the host device 100 through the host device interface 160, the peripheral device 170 is capable of accessing and manipulating the information 140 contained on the host device 100 when the host device is in a sleep, dormant or other "semi-active" mode. In particular, when access has been granted to the peripheral device 170, the peripheral device 170 is capable of performing actions such as displaying content for viewing by a user on the host device 100, editing files and other content, and transferring content to other devices. With this configuration, a user is capable of accessing and manipulating the information 140 on the host device 100 even if the host device 100 is not fully active. The accessing of information, in addition to being upon direct command from the user, could also occur automatically in response to an event such as, for example, the arrival of a pre-authorized email message.

In addition to the above, both the host device 100 and the peripheral device 170 are configured, through the use of included computer code at their respective memories, to establish and maintain rules regarding when "handoffs" are to occur between the host device 100 and the peripheral device 170. For example, typical rules may include the peripheral device 170 obtaining and maintaining control over the information 140 whenever the host device 100 enters the semi-active mode, and the host device 100 regaining control whenever it awakens. Additionally, the rules may contain information as to when the host device 100 is to awaken, such as after a predetermined period of time or upon the occurrence of a particular event. The transfer of control from one device to the other can be "seamless" from the user's point of view, with no noticeable change in performance.

Figure 2:
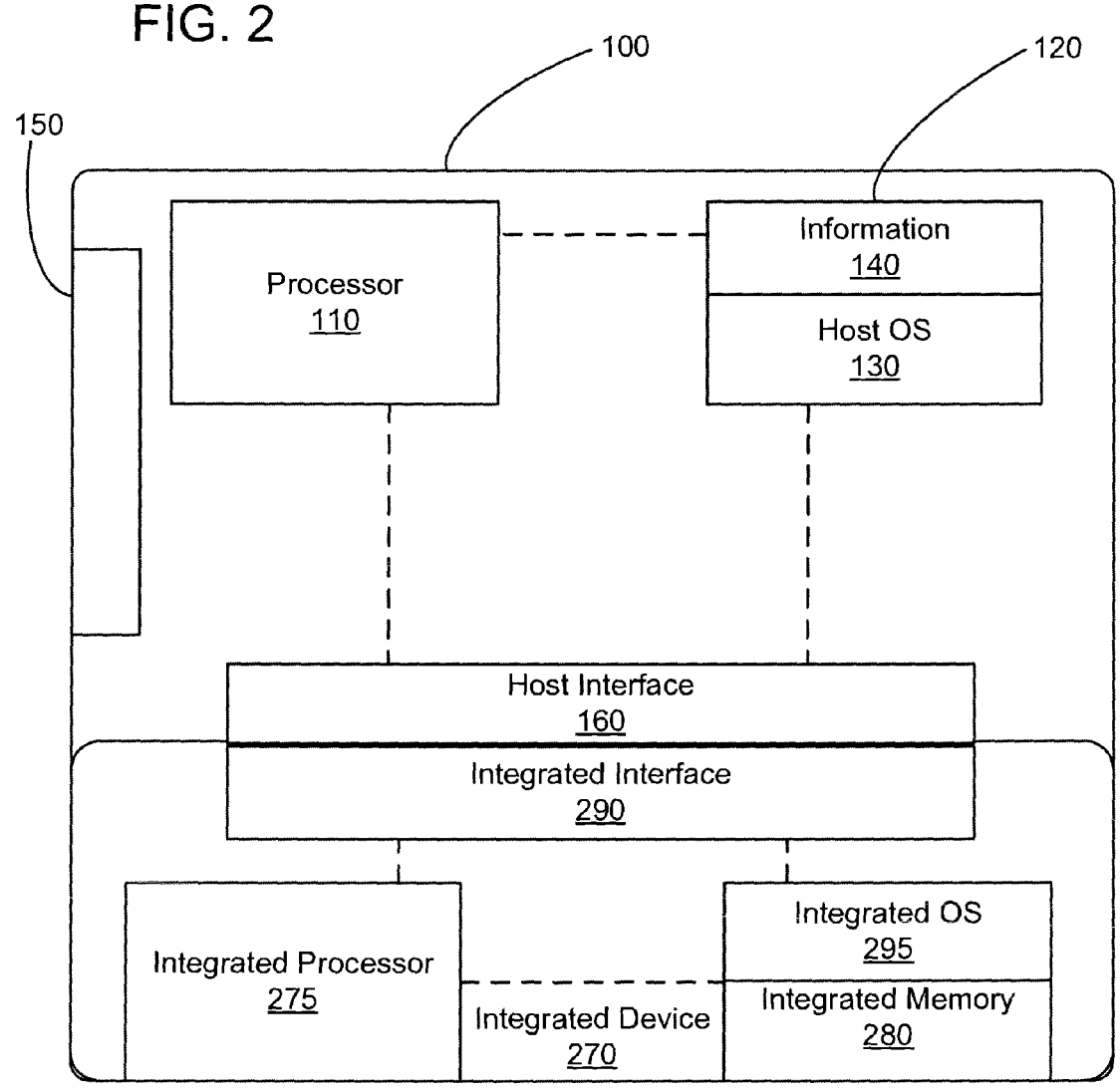
FIG. 2 is a representation a system implementing an alternate embodiment of the present invention, where a host device includes an additional integrated device instead of being associated with a separable peripheral device.

FIG. 2 is a representation a system implementing an alternate embodiment of the present invention. Like the embodiment depicted in FIG. 1, FIG. 2 shows a host device 100 including a processor 110 and a memory 120, with the memory 120 including a host native operating system 130 and a plurality of other information 140. However, instead of the peripheral device 170, an integrated device 270 is integrated into the host device 100. The integrated device 270 includes an integrated interface 290, an integrated processor 275 and an integrated memory 280, with the integrated memory 280 including the integrated device's own operating system 295. The integrated device 270, which can comprise a wireless modem in one embodiment of the invention, performs in substantially in the same manner as the peripheral device 170 of FIG. 1.

Figure 3:
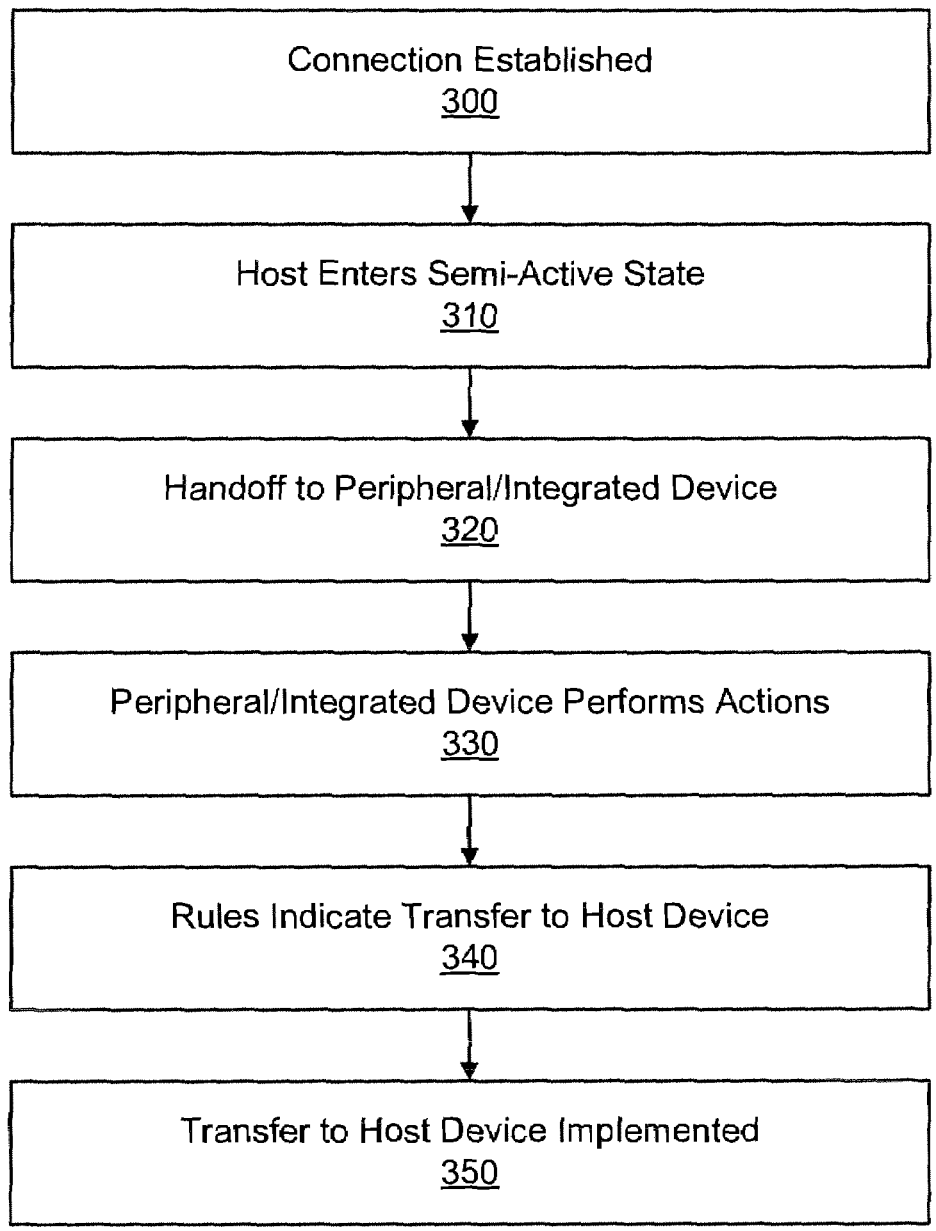
FIG. 3 is a flow chart showing the implementation of various embodiments of the present invention.

FIG. 3 is a flow chart showing the implementation of various embodiments of the present invention. In the case where a peripheral device 170 is used instead of an integrated device 270, a connection is established between the host interface 160 and the peripheral interface 190 at 300. In the case of an integrated device 270, the integrated interface 290 is already associated with the host interface 160. At 310 (and for both embodiments discussed above), an action occurs that causes the host device 100 to enter a dormant, sleep or other semi-active power-saving state. The occurring action can comprise, for example, an extended period if inactivity at the host device, or a specific command from the user to enter such a state. At 320, and in accordance with the existing rules, a handoff occurs from the host device 100 to the peripheral device 170 or integrated device 270. Subsequently, the peripheral device 170 or integrated device 270 can perform various actions on files and other information at the host device 100 at 330. As discussed above, these actions may include the displaying of content, the editing of content, the transferring of content and the other actions. At 340, an action occurs which, as dictated by the rules at the respective devices, dictates a handoff back to the host device 100. In response to this activity, the handoff occurs at 350.

Communication devices implementing various embodiments of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

The present invention is described in the general context of method steps, which may be implemented in one embodiment by a program product including computer-executable instructions, such as program code, executed by computers in networked environments Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method, comprising:
associating a secondary device interface of a secondary device with a host device interface of a host device;
in response to an indication that the host device is entering a semi-active state, performing a first handoff of control functions from the host device to the secondary device; and
using the secondary device to manipulate information contained on the host device while the host device is in the semi-active state.

2. The method of claim 1, wherein the secondary device is integrated into the host device.

3. The method of claim 2, wherein the secondary device comprises a wireless modem.

4. The method of claim 1, wherein the secondary device comprises a peripheral device separate from the primary device, and wherein the associating of the secondary device interface with the host device interface comprises establishing a connection between secondary device interface with the host device interface.

5. The method of claim 4, wherein the connection comprises a wired connection.

6. The method of claim 4, wherein the connection comprises a wireless connection.

7. The method of claim 1, wherein the manipulation of information comprises exhibiting content for a user.

8. The method of claim 1, wherein the manipulation of information comprises editing content.

9. The method of claim 1, wherein the manipulation of information comprises transferring content to another device.

10. The method of claim 1, further comprising:
in response to an indication of an activity corresponding to a predefined rule, performing a second handoff of control functions from the secondary device to the host device.

11. A computer program product, embodied in a non-transitory computer-readable medium, comprising:
computer code for associating a secondary device interface for a secondary device with a host device interface of a host device;
computer code for, in response to an indication that the host device is entering a semi-active state, performing a first handoff of control functions from the host device to the secondary device; and
computer code for using the secondary device to manipulate information contained on the host device while the host device is in the semi-active state.

12. The computer program product of claim 11, wherein the secondary device is integrated into the host device.

13. The computer program product of claim 12, wherein the secondary device comprises a wireless modem.

14. The computer program product of claim 11, wherein the secondary device comprises a peripheral device separate from the primary device, and wherein the associating of the secondary device interface with the host device interface comprises establishing a connection between secondary device interface with the host device interface.

15. The computer program product of claim 14, wherein the connection comprises a wired connection.

16. The computer program product of claim 14, wherein the connection comprises a wireless connection.

17. The computer program product of claim 11, wherein the manipulation of information comprises exhibiting content for a user.

18. The computer program product of claim 11, wherein the manipulation of information comprises editing content.

19. The computer program product of claim 1, wherein the manipulation of information comprises transferring content to another device.

20. The computer program product of claim 11, further comprising:
computer code for, in response to an indication of an activity corresponding to a predefined rule, performing a second handoff of control functions from the secondary device to the host device.

21. A host device, comprising:
a processor;
a memory communicatively connected to the processor and including accessible information;
a host interface communicatively connected to at least one of the processor and the memory; and
an integrated device selectively communicatively connected to the information via the host interface,
wherein the host device is configured to perform a first handoff of control functions to the integrated device when the host device enters a semi-active state, and wherein the integrated device is configured to manipulate the information in the memory when the first handoff has been completed.

22. The host device of claim 21, wherein the integrated device comprises a wireless modem.

23. The host device of claim 21, wherein the manipulation of information comprises exhibiting content for a user.

24. The host device of claim 21, wherein the manipulation of information comprises editing content.

25. The host device of claim 21, wherein the manipulation of information comprises transferring content to another device.

26. The host device of claim 21, wherein the integrated device is further configured to, in response to an indication of an activity corresponding to a predefined rule, performing a handoff of control functions back to the host device.

27. A system, comprising:
a host device including accessible information and a host device interface; and
a peripheral device including a peripheral device interface and being communicatively connected to the host device via the peripheral device interface, wherein the host device is configured to perform a first handoff of control functions to the peripheral device when the host device enters a semi-active state, and wherein the peripheral device is configured to manipulate the accessible information contained on the host device when the first handoff has been completed.

28. The system of claim 27, wherein the manipulation of information comprises exhibiting content for a user.

29. The system of claim 27, wherein the manipulation of information comprises editing content.

30. The system of claim 27, wherein the manipulation of information comprises transferring content to another device.

31. The system of claim 27, wherein the integrated device is configured to, in response to an indication of an activity corresponding to a predefined rule, perform a handoff of control functions back to the host device.

32. The system of claim 27, wherein a wired connection is used to communicatively connect the host device to the peripheral device.

33. The system of claim 27, wherein a wireless connection is used to communicatively connect the host device to the peripheral device.

\* \* \* \* \*